No. 635,730. Patented Oct. 24, 1899.
C. LUKE.
PREPAYMENT ATTACHMENT FOR METERS.
(Application filed Apr. 11, 1899.)

(No Model.) 6 Sheets—Sheet 1.

Fig. 1.

WITNESSES.
Charles F. Logan.
James M. Urquhart.

INVENTOR.
CHARLES LUKE.
BY Crosby & Gregory
ATT'YS.

No. 635,730. Patented Oct. 24, 1899.
C. LUKE.
PREPAYMENT ATTACHMENT FOR METERS.
(Application filed Apr. 11, 1899.)

(No Model.) 6 Sheets—Sheet 2.

WITNESSES.
Charles F. Logan.
James M. Urquhart.

INVENTOR.
CHARLES LUKE.
BY Crosby & Gregory
ATT'YS.

No. 635,730. Patented Oct. 24, 1899.
C. LUKE.
PREPAYMENT ATTACHMENT FOR METERS.
(Application filed Apr. 11, 1899.)
(No Model.) 6 Sheets—Sheet 3.

WITNESSES.
Charles F. Logan.
James M. Urquhart.

INVENTOR.
CHARLES LUKE.
BY Crosby & Gregory
ATT'YS.

No. 635,730. Patented Oct. 24, 1899.
C. LUKE.
PREPAYMENT ATTACHMENT FOR METERS.
(Application filed Apr. 11, 1899.)//

(No Model.) 6 Sheets—Sheet 6.

WITNESSES.
Charles F. Logan
James M. Urquhart

INVENTOR.
CHARLES LUKE.
BY Crosby & Gregory
ATT'YS.

UNITED STATES PATENT OFFICE.

CHARLES LUKE, OF MILFORD, CONNECTICUT, ASSIGNOR TO THE NEW HAVEN NOVELTY MACHINE COMPANY, OF NEW HAVEN, CONNECTICUT.

PREPAYMENT ATTACHMENT FOR METERS.

SPECIFICATION forming part of Letters Patent No. 635,730, dated October 24, 1899.

Application filed April 11, 1899. Serial No. 712,623. (No model.)

*To all whom it may concern:*

Be it known that I, CHARLES LUKE, of Milford, county of New Haven, State of Connecticut, have invented an Improvement in Prepayment Attachments for Meters, of which the following description, in connection with the accompanying drawings, is a specification, like letters and figures on the drawings representing like parts.

This invention has for its object the production of a novel prepayment attachment adapted to be applied to an ordinary meter having, it may be, an ordinary recording mechanism to measure the fluid or gas.

The attachment constituting the subject-matter of this application involves in its construction a rotative slidable shaft controlling the action of the gas-regulating valve, said shaft deriving its movement to open the valve from a toothed operating-wheel loosely splined on said shaft and a money-carrier mounted loosely to be rotated on said shaft freely in but one direction, said money-carrier having an engaging device, and which, acted upon by a coin thrust into the money-carrier, is made to couple the money-carrier temporarily with the toothed wheel, so that rotation of the money-carrier by hand will rotate the toothed wheel and its shaft and at the same time effect the sliding of the shaft in a direction to open the valve, the extent of rotation of the said shaft and its consequent longitudinal movement depending on the greater or less extent of its rotation, while the coin in the money-carrier acts to effect the coupling of the money-carrier with the toothed wheel by or through the engaging device, this time being governed by a "delivery-regulator," as I have chosen to herein designate the device, under the control of the operator and capable of being adjusted from time to time as the price of gas varies, to thereby insure the delivery to the consumer of a quantity of gas equivalent of the unit-coin used, said regulator in the present instance of my invention being shown as cylindrical and surrounding said money-carrier, said regulator being provided with a stop, whereby the money can be discharged through a throat or opening in said regulator and from thence pass into a tray or box; and my improved organization of parts is such that it can be applied to any of the existing types of meters without changing the latter, which is an essential point, and the coin-carrier for the purpose of detecting the placing of a wire or other like counterfeit in the coin-slot has a continuous movement always in the same direction.

In some places and States—as, for instance, in the State of New York—the price of gas must by statute be reduced five cents per year until the price is brought to one dollar per thousand feet, and to provide for this yearly reduction in price without changing the parts of the meter requires very considerable thought and experiment, for in adapting my present prepayment attachment to meters I found that gas was sold in most places for about two dollars a thousand feet and that many thousands of meters were in use, which meters had registering mechanisms built on the basis of registering each one thousand feet of gas in four divisions of two hundred and fifty feet each. The gas companies desire to retain these meters without change, and to enable them to do so and also to enable the consumers to be benefited by the annually-reduced price I use in connection with the delivery-regulator a scale or price-indicator, which I have ascertained for perfect results with existing recording mechanism must have differently-spaced marks thereon, located to compensate for variations in the successive reductions of the price of gas, as hereinbefore specified, and this price-indicating scale coöperates with a pointer carried by the price-regulator, the pointer being adapted to be set opposite a predetermined mark on the scale.

Referring to the annexed drawings, Fig. 2ᵃ is a detail showing the gears $d^4$ and $d^8$. Fig. 3 is a section in the line $x$, Fig. 1. Fig. 3ᵃ shows the cam end of the valve-stem. Fig. 3$^b$ shows the finger $b^{10}$ detached.

The case A of the meter, said meter being supposed to be of the form using diaphragms, the shaft $a$, having a connected lever $a'$, provided with a pin $a^2$, which receives on it the links $a^3$ $a^4$, connected, respectively, with the arms $a^5$ $a^6$, attached, respectively, to shafts $a^7$ $a^8$, by which said arms and links are made to rotate the shaft $a$, and the worm $a^9$ on the shaft $a$, it engaging a worm-toothed gear $a^{10}$ on a shaft $a^{12}$, said shaft driving the usual recording mechanism A', are and may be all as usual in meters now in common use.

Figure 1:
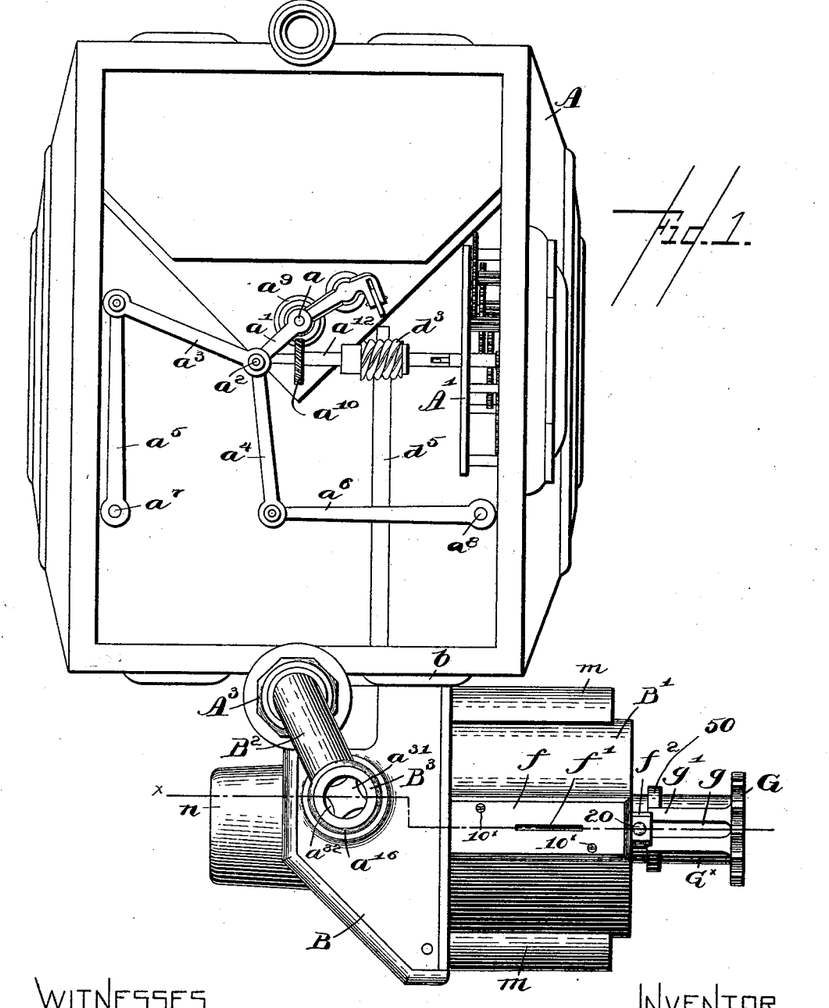
Figure 1 is a top or plan view of one form of meter with its top removed and my improvements added.

My prepayment attachment is contained in a case or frame B, having a tubular extension B', (see Figs. 7 and 8,) which constitutes a support to receive within it or sustain the delivery-regulator to be described, and a foot $b$, (see Fig. 1,) which may be fixed in usual or suitable manner to the meter-case A.

Figure 2:
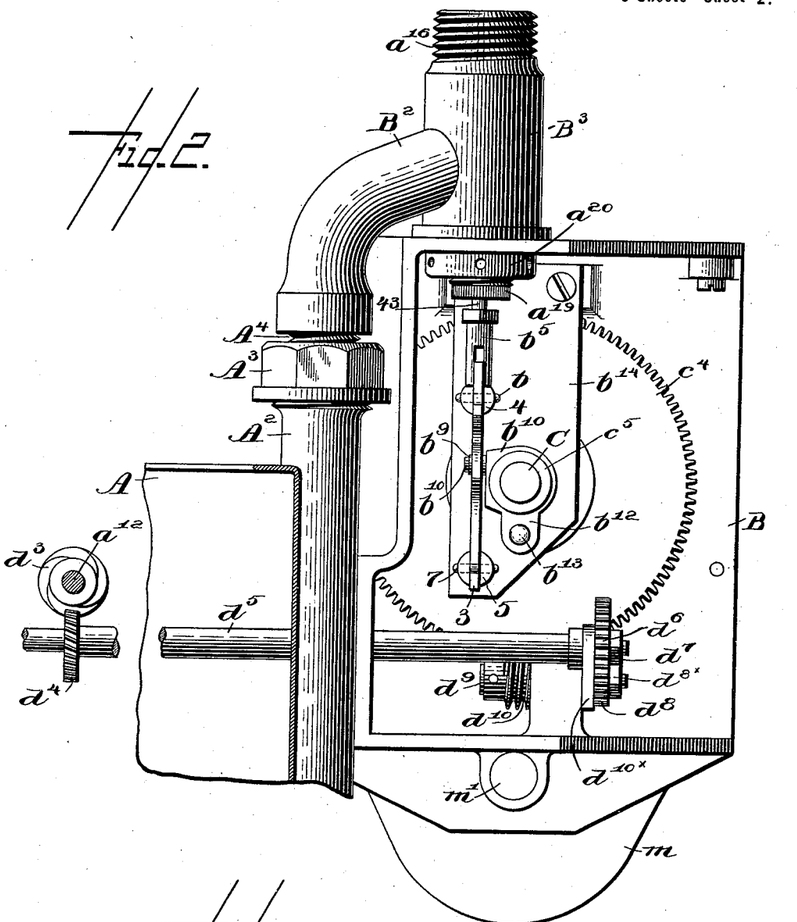
Fig. 2 is a side view showing part of the meter-case and the case of the attachment with one of its walls omitted.

The usual gas-inlet pipe A$^2$ of the meter (shown best in Fig. 2) has at its upper end a thread of usual character, which receives a loose nut A$^3$, rotatable about a threaded part A$^4$, screwed into the threaded end of an extension B$^2$ from the valve-case B$^3$. The outer end of said case B$^3$ is threaded at $a^{16}$, that it may be connected in usual or suitable manner with the street service-pipe. (Not shown.) The valve-case has a threaded portion 42, in which is screwed the valve-stem guide $a^{18}$, said guide being in turn threaded internally to receive a suitable stuffing-box $a^{19}$, in turn threaded externally to receive a clamping-nut $a^{20}$, by which to confine the said casing to the plate $b'$ of the case B. The valve-case has an outwardly and downwardly flaring valve-seat $b^2$, against which acts the conical face of the gas-controlling valve $b^3$, mounted on a stem $b^4$, screwed into and thereby adjustably connected with the threaded block or nut $b^5$, connected, as herein shown, by a pin $b^6$ to a cam-slide $b^7$, which forms a part of the valve-stem. This slide has a cam-slot $b$ and two ears 2 3, which are shown as guided by slotted studs 4 5, the said ears entering said slots and being kept therein by suitable pins 6 7. (See Fig. 3.) The valve-case at a point above the seat has an annular chamber $a^{30}$, in which is placed a guard-plate $a^{31}$, said guard-plate being made as a disk, with portions of its periphery cut away to leave spaces $a^{32}$. This guard-plate serves the purpose of preventing the user of a gas-meter, if dishonest, from inserting a wire in the casing and pushing the wire into the space between the valve-seat and valve. A wire inserted in the space $a^{32}$ will meet the shoulder $a^{33}$ and cannot get between the valve-seat and valve.

Figures 3, 3A, 3B:
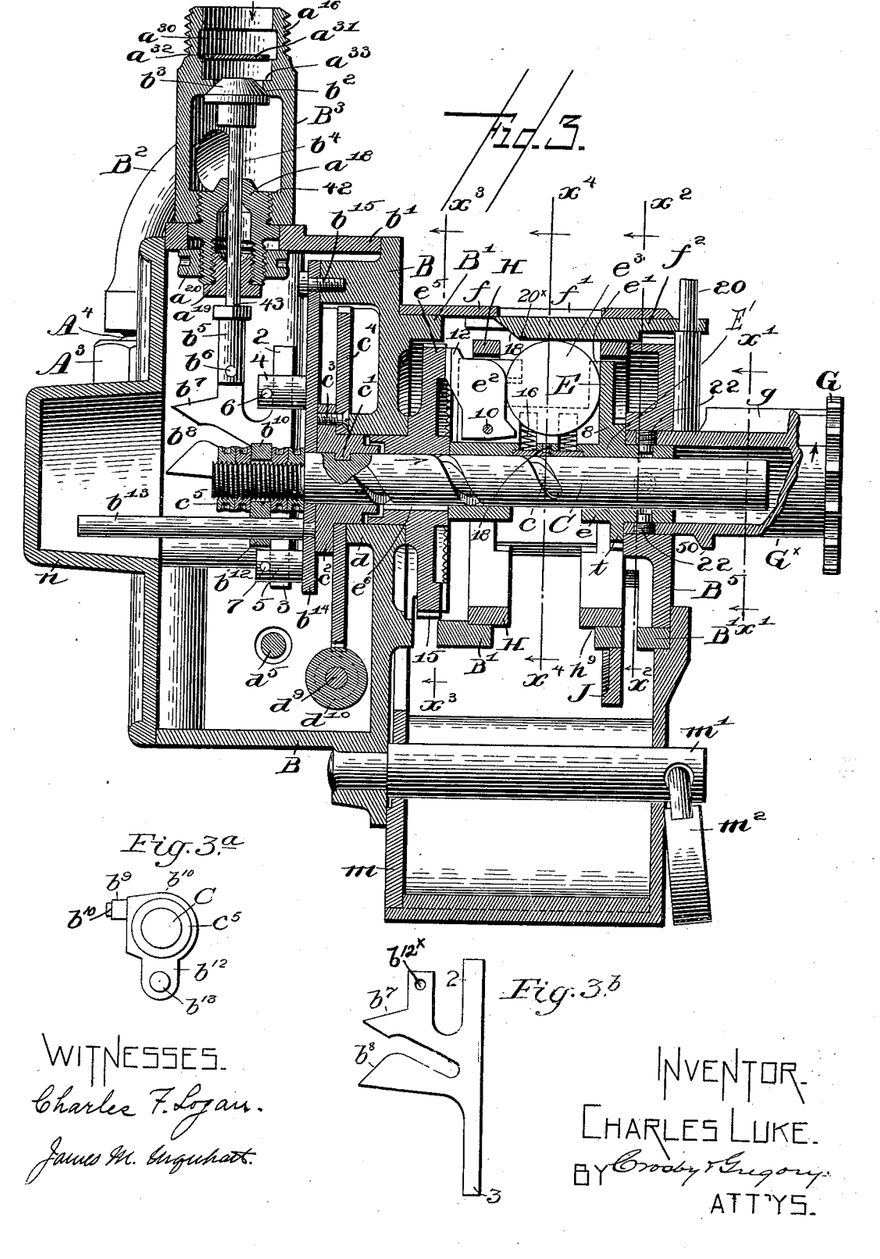

The slot $b^8$ is entered by a roller or other stud $b^9$, carried by a lever-like finger $b^{10}$, provided with a hole and surrounding loosely and movable longitudinally with a valve-controlling shaft C, to be described, a portion $b^{12}$ of said lever (see Figs. 3 and 3$^b$) having a hole $b^{12\times}$, which fits over a guiding-stud $b^{13}$, extended from a plate $b^{14}$, fixed to the case B by a screw $b^{15}$, said plate also supporting the studs 4 and 5. The plate $b^{14}$ has a hole through it for the reception of the shaft C, said shaft being free to slide in said hole, the shaft having a spiral groove $c$, in which enters a projection or thread $c'$ from the hub $c^2$, surrounding said shaft loosely and having attached to it by a suitable screw or screws $c^3$ a toothed gear $c^4$, said hub and gear constituting what may be hereinafter designated as a toothed nut, it being moved solely by the meter mechanism to thereby return the shaft C into its initial position and effect the closing of the valve. The left-hand end of the shaft C is threaded, as represented in Fig. 3, and receives at each side of said loose finger $b^{10}$ two like nuts $c^5$, two of said nuts performing the function of set-nuts for the other two. The right-hand end of the hub $c^2$ of the toothed nut enters a hollow bearing $d$, made in the case B, so that said nut may turn in the space between the end of the bearing $d$ and the inside of the plate $b^{14}$; but said nut cannot move longitudinally. The teeth of the periphery of the nut $c^4$ are engaged, and the said nut may be driven in one direction only by a worm $d^{10}$ on a short shaft $d^9$, held in a stand $d^{10\times}$, rising from the case B, said shaft having at one end an attached toothed pinion $d^8$, held in place by a nut $d^{8\times}$.

Figure 2A:
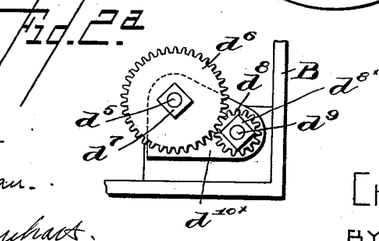

The pinion $d^8$ (see Fig. 2$^a$) is turned to the left by a toothed wheel $d^6$, clamped frictionally by a suitable nut $d^7$ on the end of a shaft $d^5$, deriving positive movement to the right by the mechanism of the meter as the latter acts to deliver gas, said shaft $d^5$ being provided with a worm-gear $d^4$, actuated by a left-hand worm $d^3$ (see Fig. 2) on the usual shaft $a^{12}$, driven by the meter mechanism to actuate the usual recording mechanism, said shaft being turned to the left, viewing the front of the meter.

The employment of the left-hand worm $d^4$ instead of a right-hand worm, as commonly done, enables the shipper $d^5$ to be rotated to the right, the direction required in order that it may rotate the shaft $d^9$, having a right-hand worm $d^{10}$, in the proper direction to turn the nut $c^4$, so that it will always act to slide the valve-controlling shaft in the direction to close the valve after the said shaft has been moved by the operator in a direction to open the valve, the nut acting to slide the shaft gradually in the direction to close the valve.

The shaft C, occupying in Fig. 3 its normal or starting position, has a straight groove 14, (shown by full lines in Figs. 5 to 8,) which is entered loosely by a key $e^6$, (shown in Figs. 3 and 7,) said key being carried in a key-seat of a toothed wheel $e^5$, surrounding said shaft, said wheel having its hub extended at the left, Fig. 3, to enter the bearing $d$.

Figure 13:
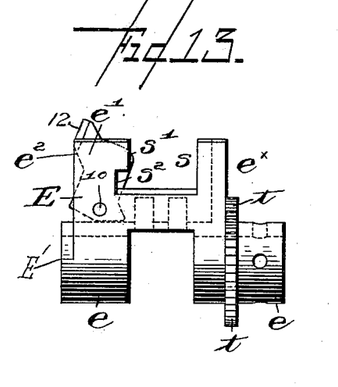
Fig. 13 is a side elevation of the money-carrier and one member of a cutting device.
Figure 14:
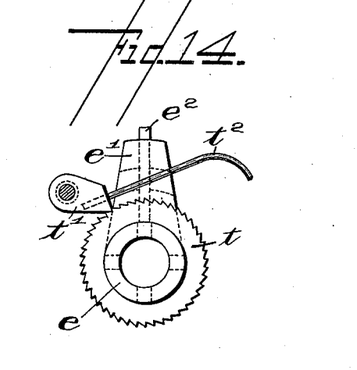
Fig. 14 shows one end of the money-carrier and a spring and pawl engaging its ratchet-wheel.
Figure 15:
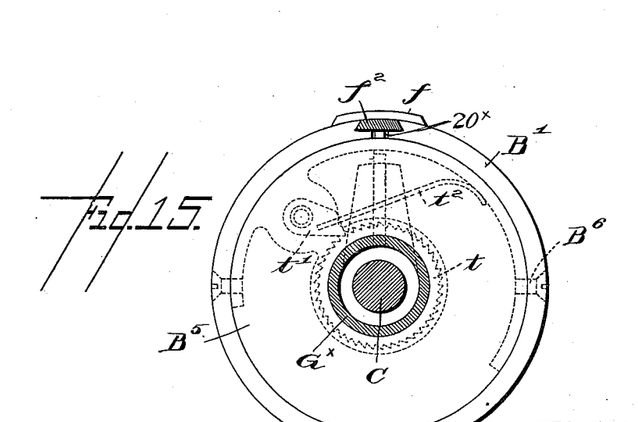
Fig. 15 shows an end view of the money-carrier in the hub B.

The money-carrier E (see Figs. 3, 13, and 14) is composed of a casting bored to form a hub E' to fit loosely and turn freely about the shaft C, said money-carrier having extended arms $e'$ $e^x$, each grooved at its inner face to form a money-holding slot, the width of each slot being of substantially the thickness of the coin to be used, there being a clear open space between said arms that they may pass in the operation of the money-carrier (to be described) a suitable stop made variable as to its position, according to variations in price of gas. The money-carrier has pivotally or movably mounted upon it by a pivot 10 in an open slot of the arm $e'$ thereof an actuating device or pawl $e^2$, (represented by full lines in Fig. 3 and partially by dotted lines in Fig. 13,) said actuating device or pawl being so shaped and pivoted in the slot of the money-carrier that it normally stands therein, as represented in Fig. 13, in its inoperative position, said position being always determined by the fact that the actuating device is overbalanced, overbalancing said actuating device obviating the necessity of a pawl for putting it into its inoperative position.

By overbalancing the actuating device in the money-carrier, as stated, whenever a coin is inserted in the money-receiving throat (to be described) and into the money-carrier (see Fig. 3) the said money acting directly against the back or edge of the actuating device or pawl will turn it about its pivot 10, so that the wedge-shaped edge 12 of said actuating device will enter and bottom in the space between adjacent teeth of a series of teeth $e^4$ (to be described) of the toothed wheel $e^5$, and said actuating device having engaged the toothed wheel referred to the money-carrier may be started in its movement by the operator through a suitable hand-operated wheel G, to be described, and turn the wheel $e^5$, so that the key $e^6$, engaging said wheel with said shaft C, will cause said shaft to be rotated, it during such operation being longitudinally slit, as will be described, to open the gas-controlling valve.

The wheel $e^5$ has at its face next the money-carrier a circular series $e^4$ of wedge-shaped teeth, (see Fig. 3,) the bevels at the opposite sides of each tooth being oppositely arranged and at substantially the same angle, and the periphery of said wheel is represented as provided with a series of peripheral teeth 15, which are engaged by a strong friction device or wheel-holder $e^7$, represented as a spring secured to the casing B of the meter by a suitable screw, (see Fig. 7,) said friction device or holder engaging the wheel $e^5$ while the meter mechanism is operating a nut $c^4$, to be described, in the direction to slide the valve-controlling shaft in a direction to close the valve, the friction device in engagement with the wheel $e^5$ compelling the said nut in its movements of rotation to always move the said valve-controlling shaft C longitudinally rather than to merely turn said shaft with it, as would be the case if the wheel $e^5$ were not locked.

In case the wheel $e^5$ was not locked and it could be turned with the shaft C as the latter was rotated by the nut, then the shaft would not be slid at all and the valve would not be closed, but the meter mechanism might continue to rotate and gas might be delivered without prepayment. By restraining the movement of the wheel $e^5$ in a direction opposite that in which it is actuated by the operator in opening the valve said wheel becomes a controller of said shaft C and prevents it from being rotated without being also slid, and thereby the closing of the valve is always assured whenever the nut $c^4$ is rotated by the meter mechanism.

The bottoms of the series of teeth $e^4$, shaped as described, are so located with relation to the teeth 15 that whenever the point or free end of the spring $e^7$ engages a space between two teeth 15 said spring puts and retains said wheel $e^5$ in one of its numerous defined positions, and in its defined positions the bottom of the space between adjacent teeth of the series of teeth $e^4$ will always stand exactly in line with the longitudinal center of the slot in the money-carrier, so that whenever the actuating device or pawl $e^2$ is actuated by a piece of money put into the carrier in direct contact with the back of said actuating device the wedge-shaped point 12 of said actuating device will enter freely and bottom in the notch between adjacent teeth of the series of teeth $e^4$.

Were it not for the fact that the spring $e^7$ effected the position of the wheel $e^5$, as stated, when the said wheel was locked at rest by the operator then the part 12 of the actuating device might when actuated by a piece of money against it meet the crown of a tooth of the series of teeth $e^4$, which would make it impracticable without injury to the machine to insert the coin and operate the prepayment attachment.

It will be understood that the wedge at the under side of the slide $f^2$, to be described, acts to force the coin fully into the slot of the money-carrier, and if the edge 12 of the actuating device at such time should stand exactly opposite the crown of a tooth of the series of teeth $e^4$ then the edge 12 of the actuating device would meet and be forced against the crown of the tooth, thereby damaging said tooth or said edge, so that after a few such operations the mechanism would become inoperative.

The money-carrier is shown as provided with a suitable hole or holes (see Fig. 3) to receive a suitable spring or springs 16, which rest at their ends next the shaft C upon a plate 17, (shown best in Fig. 8,) said plate being held in place by a suitable stud-screw 18.

The right-hand hub or end of the money-carrier (see Figs. 3 and 13) is represented as provided with a series of holes, in which enter the ends of a series of stud-screws 22, said stud-screws being screwed flush into a sleeve or barrel $G^\times$, forming part of a hand-wheel G, which may be engaged by the user of the meter whenever it is desired to move the money-carrier by hand to transfer the money placed therein into a money-receiving box $m$ preparatory to starting the meter.

The exterior B' of the case B has attached to its upper side by suitable rivets or screws 10 a plate $f$, having a money-receiving throat $f'$, through which the money is introduced into the money-carrier. Immediately under this throat is a slide $f^2$, preferably made dovetailed in cross-section, as represented in Fig. 6, said slide having at its under side a fin $20^\times$ and at its end a stud 20, which may be engaged by the operator when it is desired to move the slide.

Figures 4, 5, 6:
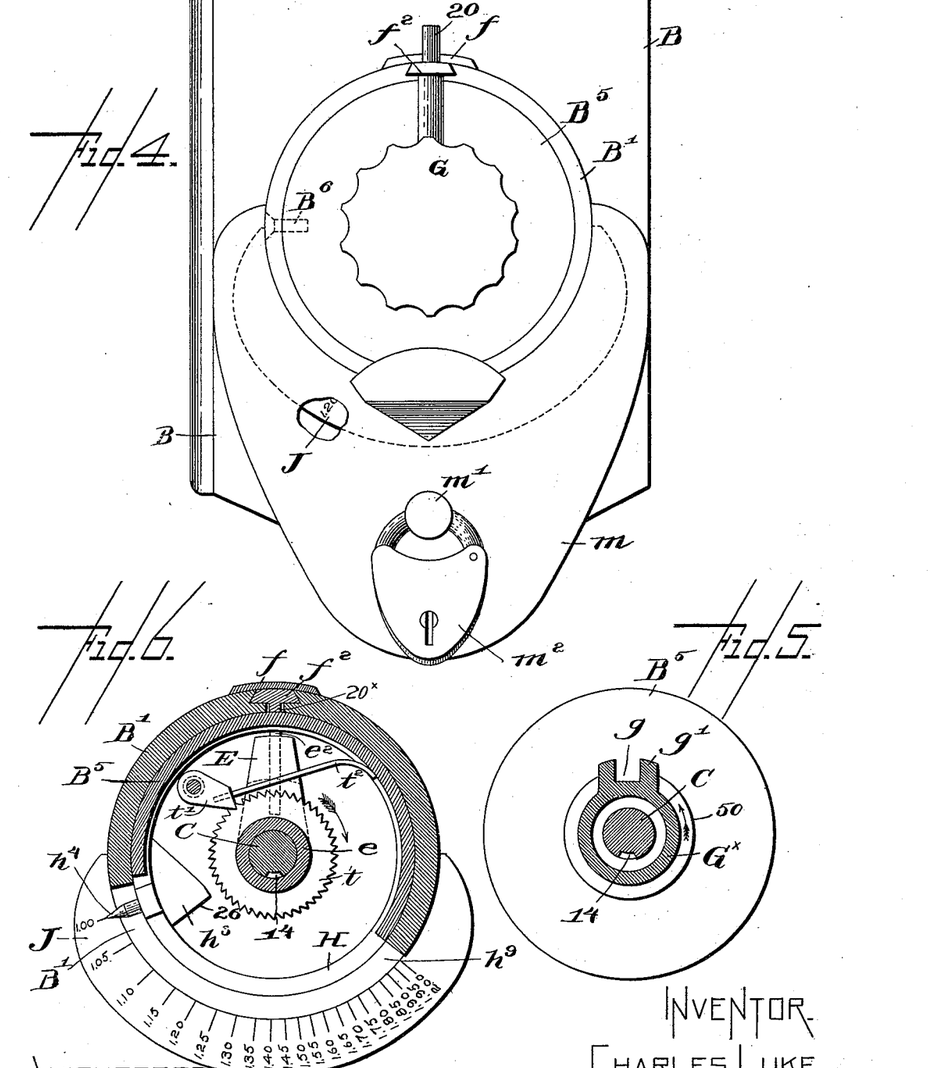
Fig. 4 shows the attachment in front elevation.
Fig. 5 is a section in the line $x'$ looking toward the left.
Fig. 6 is a section in the dotted line $x^2$.

When the hand-wheel G referred to is in its normal position, as represented in Figs. 3 and 5, the operator may engage the stud 20 and move it to the right, causing the lower end of said stud to enter a groove $g$ in a projection $g'$, extended from the sleeve or barrel $G^\times$, such movement uncovering the throat for the introduction of the money, and the money is put in the throat and passed through between suitable guides or cheeks, which, as herein shown, form a part of the delivery-regulator, to be described, and is made to enter the slot of the money-carrier, and this done the slide $f^2$ is moved to the left, causing its beveled end 18 and the fin to act on the edge of the money and depress it against the spring or springs 16 and at the same time crowd the money into the slot of the money-carrier, so that its edge meets directly the back of the actuating device or pawl $e^2$ and turns it so that the projection 12 thereof engages one of the side teeth of the wheel $e^5$, and thereafter the hand-wheel G may be engaged and rotated in the direction of the arrow thereon in Fig. 3. This change of position of the hand-wheel causes the substantially annular cam edge 50 extended therefrom to act against the lower end of the stud 20 and form a locking device to hold the slide in its closed position, so that the said slide cannot be again drawn out to gain access to the money until after the money has been discharged and the money-carrier has been returned to its starting position.

One hub $e$, from which extend the arms $e'$ $e^\times$ and constituting the acting part of the money-carrier, is provided with a ratchet-wheel $t$, fitted to said hub and contacting with the arm $e^\times$, and the teeth of said wheel are engaged by a detent $t'$, mounted on a fixed pin or stud of the head-plate $B^5$, said detent being acted upon by a suitable spring $t^2$, resting at one end against a fixed part of the apparatus, said pawl insuring that the money-carrier may be moved in but one direction.

Figures 7, 8, 9, 10, 11, 12:
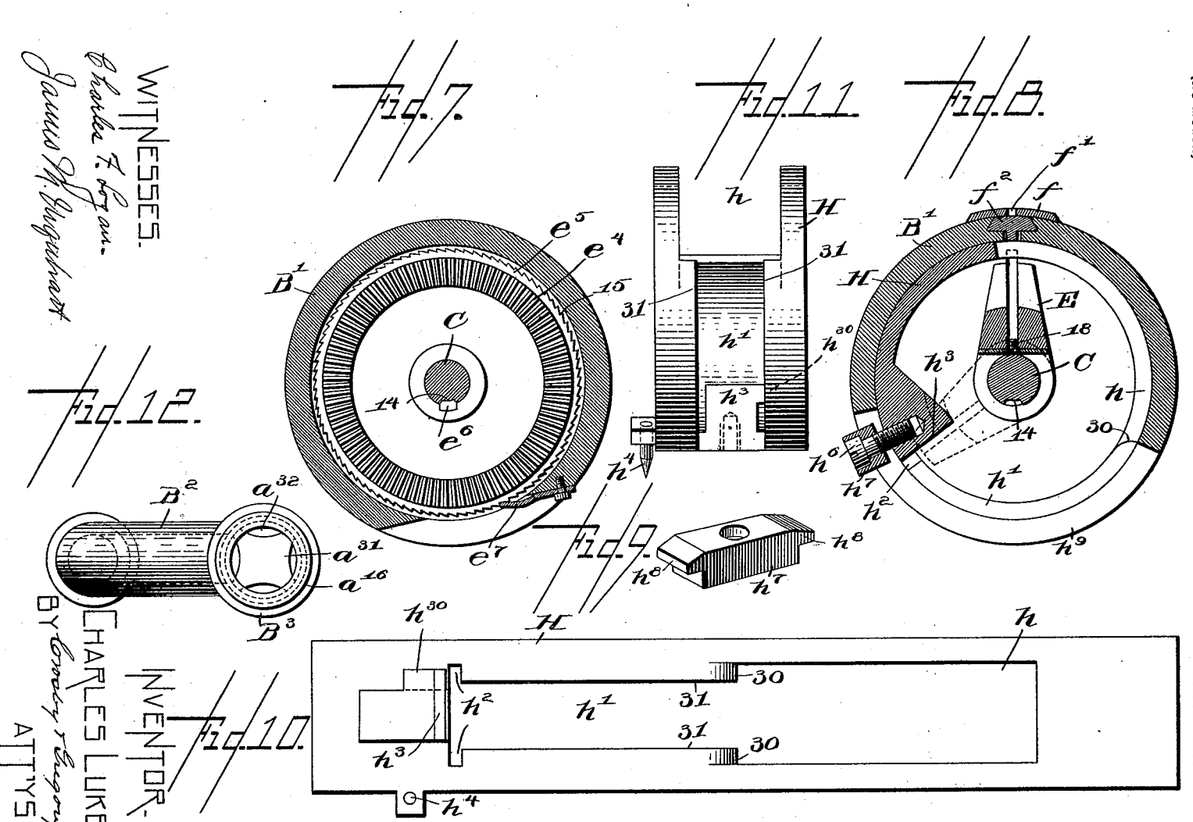
Fig. 7 is a section in the line $x^3$.
Fig. 8 is a section in the line $x^4$.
Fig. 9 is a detail of the clamp detached.
Fig. 10 shows the delivery-regulator laid out or developed.
Fig. 11 shows the delivery-regulating ring in elevation.
Fig. 12 is a plan view looking into the open upper end of the valve-case.

The tubular part B' of the case B receives within it the delivery-regulator H, hereinbefore mentioned, it being shown in Figs. 6 and 8 as a cylinder or ring. Fig. 10 shows the said ring cut in two and laid out or developed. The delivery-regulator is represented as slotted for most of its length, the slots being shown of different widths, as represented by $h\ h'$, and at the end of the slot $h'$ there is a money-discharging throat $h^2$ and next one side of said slot a money-stop $h^3$. This delivery-regulator also has connected with it a pointer $h^4$. The side walls of the wider part $h$ of the slot stand in all adjustments of said price-regulator under and in line with the ends of the money-receiving throat $f'$, through which the money is pushed to enter the money-carrier, and the width of the slot $h$, and consequently the position of its side walls, is such as to guide and prevent any wrong position being taken by the money in the passage of the throat $f'$ into the money-carrier and the under side of the fin $20^\times$ described. The guiding part or edges of the side walls of the wider slotted part $h$ is an important feature of this invention, and for accuracy of operation the said guiding part or wall is made to form an integral part of the delivery-regulator, and it will be understood that the side walls of said slot $h$, which is located nearest the upper end of the engaging device, actually prevent the money acted upon by the fin $20^\times$ in crowding the money into the money-carrier from contacting so forcibly with the back of the engaging device as to injure or injuriously force the end of the latter into engagement with the toothed wheel $e^5$. The narrower part $h'$ of the slot always stands at or below the center of the shaft C, so that the money having been put into the money-carrier and the latter started in motion it will be readily seen that as soon as the money-carrier begins to travel about the lower part of the shaft C the edge of the money projecting from said carrier will meet the inclines 30, made at the junction of the two slots $h$ and $h'$, and thereafter the edge of the piece of money will be sustained by the edges 31 of the slot $h'$.

The delivery-regulator, circular or cylindrical at its exterior, fits within the circular extension B' of the case and is made adjustable therein with relation to the money-receiving throat $f'$ thereof, and by being cylindrical and coöperating with a cylindrical space said regulator is made more durable and may be more easily adjusted. The delivery-regulator at that part thereof carrying the stop $h^3$ is provided with a screw-thread which receives a set-screw $h^6$, said screw entering a hole in a clamp $h^7$, having ears $h^8$, so that said clamp may follow with the regulator in all its adjustments, the screw in the adjustments of the regulator traveling in a slot in the support B' and acting against said portion B', said screw being extended through a slot $h^9$. By loosening this screw and releasing the pressure on the clamp $h^7$ on the portion or extension B' it will be obvious that the circular delivery-regulator supported by the portion or case B' may be rotated more or less to place the pointer or index $h^4$ thereof in a position to coöperate with the desired price-scale or line of the price-indicator J to be described, and in its adjusted position the clamp and its screw to retain the regulator in place are left connected with and are inaccessible to only the person who collects the money from the meter. The adjustment of this regulator puts the money-discharging throat $h^2$, located at the end of the narrower slot $h'$, at one side of the stop $h^3$, into any desired position, that depending upon the quantity of gas to be delivered as an equivalent of the unit coin put into the meter and the price at which the gas is being sold, it being understood that the farther the said throat $h^2$ and the stop from the money-receiving throat in the direction of the rotation of the money-carrier the greater will be the extent of the sliding motion of the shaft C, and consequently the longer will the gas-valve be held open, the said money-discharging slot being more distant from the money-receiving slot of the extension B' of the case B in the direction of the rotation of the carrier as the price of gas is reduced.

Inasmuch as the money cannot be discharged from the money-carrier through the delivery-regulator at any point except at the discharging-throat $h^2$ thereof, it becomes necessary to adjust the delivery-regulator so that said throat will come into exactly the proper position, such position being controlled and indicated by the action of the pointer $h^4$ in connection with the scale of the price-indicator J. The price-indicator J is shown as having a scale or series of marks to show, preferably, by figures the price of gas, said marks designating the price of gas from one to two dollars a thousand, with five-cent variations between. I have placed these scale-marks on the price-indicator after a series of careful tests, using test-holders, so that the lines of the scale-marks occupy exactly the position they should occupy on the price-indicator to insure the delivery of an amount of gas exactly in accordance with the money put into the money-carrier. The piece of money which this present meter has been devised to receive is a twenty-five-cent piece or a quarter-dollar, and the money put into the money-carrier must be discharged therefrom sooner or later in the movement of the money-carrier from its initial or starting position, where it receives the money according to the price of gas, and as the meter is herein constructed the shaft C may be moved, as will be hereinafter described, four times in succession by the introduction of a quarter-dollar into the money-carrier, thus enabling only its worth of gas to be prepaid, or the shaft may be moved any less number of times than four, so that the money-carrier may be provided with a quarter of a dollar. As soon as the money in the money-carrier comes opposite the money-discharging throat the springs $h^{16}$ act to discharge the money through said throat into a suitable money receiver or box $m$, it being herein represented as removably mounted upon a stud $m'$, the box embracing, covering, and protecting from access the screw and clamp for altering the position of the delivery-regulator, and said box may be locked in its inoperative position on said stud by a padlock $m^2$ or in any other suitable manner, and said lock must be unlocked and removed when it is desired to remove the money-box to take the money therefrom.

Figure 16:
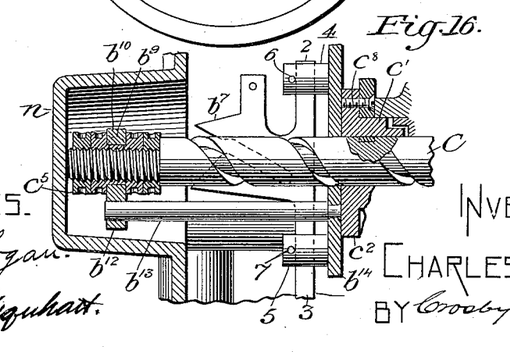
Fig. 16 is a detail showing the end of the valve-controlling stem fully operated and arrested by its stop.

Figs. 6 and 8 show the delivery-regulator set to sell gas at one dollar per thousand, the pointer $h^4$ of the regulator standing opposite the one-dollar mark. Let it be supposed that the hand-wheel G is in its normal position, with the slot $g$ uppermost, that the slide $f^2$ is drawn back to uncover the money-receiving throat $f'$, the stud 20 of the slide standing in the slot $g$, and that the shaft C occupies its position normally fully to the right, (see Fig. 3,) and that the finger $b^{10}$ stands in the inner end of the slot $b^8$ of the valve-stem, and that the valve is closed. In this condition a piece of money—say a quarter-dollar—may be put in the money-receiving throat $f'$, be passed through the wider portion $h$ of the circular delivery-regulator, said wider portion then standing, as in Fig. 8, underneath said money-receiving throat, and said money is made to enter between the grooved arms of the money-carrier. In this condition the operator engages the pin 20, pushes the slide $f^2$ to the left, Fig. 3, causing the beveled end $a$ thereof to meet the edge of the money and press it downwardly into the money-carrier, compressing the springs 16 thereof, and at the same time the money by acting directly against the actuating device or pawl $e^2$, turns said device about its pivot 10, causing the tooth 12 to meet and engage a tooth of the series of teeth $e^4$ at the side of the toothed wheel $e^5$, connected loosely with the shaft C, by the key $e^6$. This coupling or engagement of the pawl with the toothed wheel $e^5$ puts the attachment in position to be operated and the operator engages the hand-wheel G and turns it and the money-carrier and with it the toothed wheel $e^5$, the key $e^6$ in the longitudinal slot 14 of the shaft causing the shaft to be rotated in unison with the wheel $e^5$ and the money-carrier, said shaft also sliding longitudinally to the left. During this rotation of the money-carrier the edge of the money as the carrier is made to travel under the center of the shaft C meets the inclines 30 at the entering end of the narrower slot $h'$ of the price-regulator and rides upon the edges 31 of said narrower slot, remaining thereon until the money in the rotation of the money-carrier arrives opposite the money-discharging slot $h^2$, and one side of the money meets the stop $h^3$. In this condition and position of the parts the springs 16 act instantly to eject the money from the money-carrier through the throat $h^2$ into the box $m$. The money as it is ejected from the money-carrier permits the actuating device or pawl $e^2$ to immediately retire from its holding engagement with the teeth $e^4$ of the ratchet-wheel $e^5$, leaving said ratchet-wheel at rest, while rotation of the money-carrier is continued in the same direction until the money-carrier is again brought into its starting position just below the throat $f'$, at which time the slide $f^2$ may be again withdrawn preparatory to putting a fresh coin into said throat and into the money-carrier, when the operation herein just described may be repeated. As the shaft C is rotated by or through the action of the toothed wheel $e^5$, engaged by the actuating device or pawl of the money-carrier, said shaft has also given to it, as stated, a sliding movement, this being due to the fact that the projection at the interior of the hub $c'$ (see Fig. 3) of the toothed nut stands in the spiral groove $c$ of said shaft, and it will be obvious that at each operation of said shaft by or through the money-carrier, as stated, the shaft is moved farther and farther in the direction of its length. The said shaft may be moved four times in succession, as herein provided for, by the insertion of a quarter of a dollar at four different times in succession, and to provide for this full extent of longitudinal movement of said shaft C, I have added to the case B a stop or projection $n$, against the inner side of which the end of said shaft C contacts when the valve-controlling shaft has been moved by the operator into its farthest position permitted by the insertion of coin into the coin-carrier. (See Fig. 16.) During this longitudinal movement of the shaft C through the toothed nut actuated by the meter mechanism said nut is restrained from rotation by or through the left-hand worm $d^{10}$, before described, and the finger $b^{10}$ is moved, viewing Fig. 3 to the left, in the slot $b^8$ of the valve-stem opening said valve, and this finger may travel far enough to entirely pass out of said slot and enter the hollow hub $n$, that depending upon the number of pieces of money put into the attachment to prepay gas. This gas-valve opened will remain opened for a longer or shorter period, according to the amount of gas prepaid, and then it will be closed. The valve having been opened by the introduction of money into the money-carrier and the movement of the latter, as described, the meter begins to work, and the shafts $a\ a^{12}$ thereof begin to rotate, and the left-hand worm $d^3$ acting on the worm-gear $d^4$ turns the shaft $d^5$ in a right-hand direction, and its toothed wheel $d^6$, causing the latter in engagement with the pinion $d^8$, fast on the shaft $d^9$, to turn the latter shaft, causing the worm $d^{10}$ to start the toothed nut $c^4$, rotating said nut in a left-hand direction, causing the projection $c'$ in said spiral groove to slide said shaft C toward its initial position. If the shaft C is moved to the left, viewing said figure, far enough to remove the finger $b^{10}$ entirely from the slot $b^8$ of the valve-stem, said finger in the return movement of said shaft will gradually come into the open mouth of the slot and will be made to travel through said slot toward its right-hand end until finally as the shaft C arrives in its normal position the finger $b^{10}$ in the slot of the valve-stem will have fully closed the valve, as represented in Fig. 3. During this operation the stud $b^{13}$ acts as a guide for the loosely-mounted finger $b^{12}$. This finger constitutes an actuator for the valve-stem, and by its adjustment it becomes possible to secure a close closing of the valve.

I found by experiment that a freely-movable money-carrier which was adapted to be moved from its receiving position into its discharging position and then to be turned backwardly into its receiving position could be tampered with. Frequently a wire or other foreign thing not a proper coin is inserted in the money-carrier by dishonest people, and to enable this to be detected I have so constructed the money-carrier that one arm thereof constitutes or carries one member of a cutting mechanism or shear—viz., the arm $e'$ of said money-carrier is notched, as at $s^2$, to leave a cutting edge $s'$, which coöperates with an edge or shoulder $h^{30}$, extended from one edge of the stop $h^3$, and this cutting mechanism must operate, for the money-carrier by reason of the addition to it of the ratchet-wheel $t$, which prevents any backward rotation of the money-carrier, can be turned in but one direction, and as it is turned from the position of the stop $h^3$, where the money ought to be discharged, the cutting mechanism referred to severs the wire.

The space $s$ (see Fig. 13) left between the two arms $e'$ and $e^\times$ of the money-carrier is of substantially the shape of the exterior of the stop $h^3$ and its projection $h^{30}$ in cross-section, so that said carrier may pass the stop $h^3$ whenever the money in the carrier has been discharged therefrom through the throat $h^2$, and thereafter the money-carrier is rotated in the same direction until it arrives at its starting-point.

If the money-carrier had a movement in both directions, a piece of wire might be put into said carrier and be made to turn the engaging device or pawl sufficiently to engage the teeth of the wheel $e^5$ to enable the money-carrier to turn the wheel, and consequently the shaft $c'$, and let on gas, and then the wire might be pulled out by a string attached to it and the money-carrier returned into its starting position.

By adding the toothed wheel $t$ to a money-carrier having cutting means, so that said carrier cannot be rotated backwardly, the prepayment attachment cannot be defaulted by the use of a wire, for such wire on arriving at the stop will remain there, showing that the meter has been tampered with, or if the movement of the money-carrier is continued the wire or other foreign medium therein holding the pawl in engagement with the toothed wheel $e^5$ will be cut between the cutting members referred to, and the pieces so formed will drop through the throat $h^2$ into the box $m$, and such pieces will call attention to the fact that the meter has been tampered with and each piece will call for twenty-five cents.

In this meter it will be noticed that the gas-valve is opened by a quick longitudinal and rotary motion imparted to the shaft C and the gas let on; but such movement does not actuate the counting or registering mechanism A'; but, on the contrary, that mechanism is actuated slowly and uniformly by the meter mechanism in the usual manner, as the gas let on by opening the valve is measured and delivered to be consumed.

I believe I am the first to provide a money-carrier having a motion of rotation in but one direction with a coupling or actuating device or pawl which may be turned by or through the action of a piece of money directly against it, said money turning said device or pawl to engage a toothed wheel and move the latter with the money-carrier, thus utilizing the money-carrier to rotate the main shaft of the prepayment attachment and at the same time slide said shaft to open and admit gas to the meter.

I also believe that I am the first to provide a prepayment attachment with a cylindrical and adjustable delivery-regulator and also to inclose said price-regulator within the inclosing case or frame of the machine, where it is inaccessible, except by unlocking and taking off the money-receiving box. Such construction provides for greater security than though a delivery-regulator were used and adjusted by a screw covered with wax, as it would be possible to remove and then restore the wax after moving the price-regulator. The gas-valve and its seat are so located that any dripping or sediment which is commonly found in gas cannot stick or adhere thereto, but must when coming upon the valve or its seat drop therefrom into the chamber 42.

I also believe that I am the first to employ a circular delivery-regulator provided with a throat or slot for the passage through it of money with a rotatable money-carrier and a price-indicator, the adjustment of the delivery-regulator with relation to the price-indicator determining readily the extent of movement which must be imparted to the coin-carrier to turn the valve-controlling stop to deliver a quantity of gas at the desired price for the value of the piece of money put into the money-carrier at each operation.

The adjustment of the price-regulator to the proper line on the price-indicator is the only change that need be made to adapt the meter to deliver a proper quantity of gas at different values for the unit coin put into the meter.

By clamping the gears $d^6$ and $d^8$ on their respective shafts it is possible for the shaft $d^5$ to be moved in case the valve $b^3$ is not fully closed upon its seat, and in this way should the valve not be closed tightly and the gas should continue to flow the gas would be indicated on the usual recording mechanism and would have to be paid for if the said recording mechanism indicated a quantity of gas passed through the meter in excess of the money deposited in the meter.

It is obvious that the price-indicator may be spaced to provide for gas at any price and that instead of actuating the shaft C by a quarter-dollar coin I may adapt the money-carrier and price-regulator readily to coin of any other desired value.

The actuating device or pawl carried by the money-carrier will hereinafter sometimes in the claims be designated by the term "coupling."

Having thus described my invention, what I claim as new, and desire to secure by Letters Patent, is—

1. In a prepayment attachment for meters, a delivery-regulator having a discharging-throat for the discharge of the money put into the meter to prepay gas, and a stop having a projecting shear portion or ear; combined with a money-carrier having a slot to receive a coin and carrying a coöperating shear portion, said money-carrier being capable of passing the stop and projection of the said regulator after the discharge of the coin from the money-carrier, and means to rotate said money-carrier in but one direction, and a price-indicator presenting a scale and a coöperating pointer, substantially as described.

2. In a prepayment attachment for a meter, a rotatable money-carrier, a movable stop and money-discharging throat, the position of which are changed as the price of gas is changed, combined with coöperating cutting means to cut a wire or other foreign substance in a money-carrier as the latter in its rotation arrives at and passes said stop and the money-discharging throat.

3. In a prepayment attachment for meters, a cylindrical case having a money-receiving throat, a valve-controlling shaft; a money-carrier mounted on said shaft and rotatable thereon by the operator; a guide interposed between the money-carrier and the end of said case to bridge the space between the money-receiving throat and the end of the money-carrier, and a suitable stop adjustable in its position and against which the money in the money-carrier is placed to be discharged through a suitable discharging-throat variable in its position with relation to said money-receiving throat.

4. In a prepayment attachment for meters, a valve-stem having a cam, a spirally-grooved shaft, means to slide said shaft, a finger mounted on said shaft loosely and coöperating with the cam of the valve-stem, means to adjust said finger on the shaft, guiding means for said finger as it is moved with said sliding shaft, a cylindrical delivery-regulator, a money-carrier rotatable within said regulator, a support for said regulator having a money-receiving throat, means to effect the adjustment of said regulator with relation to said throat, and means carried by the money-carrier and operable by a coin for coupling the latter to said shaft.

5. In a prepayment attachment for meters, a cylindrical delivery-regulator having a circumferential slot and a money-discharging throat, one part of said slot being of a width in excess of the diameter of the coin to be fed into the meter that said coin may pass said regulator and enter the slot of the money-carrier, the other part of said slot being of a width less than the diameter of said coin to thereby support one edge of the coin extended from the slot of the money-carrier until said coin is brought by the circular movement of the money-carrier into position opposite said money-discharging throat, a support for said delivery-regulator having a money-receiving throat, means to effect the adjustment of said regulator with relation to said throat, and a money-carrier rotatable within said regulator and coöperative therewith.

6. In a prepayment attachment for meters, a cylindrical delivery-regulator having a circumferential slot and a money-discharging throat, one part of said slot being of a width in excess of the diameter of the coin to be fed into the meter that said coin may be passed through said regulator and into the slot of the money-carrier, the other part of said slot being of a width less than the diameter of the said coin, to thereby support one edge of the coin extended from the slot of the money-carrier until said coin is brought by the circular movement of the money-carrier into position opposite said money-discharging throat, a support for said delivery-regulator having a money-receiving throat, means to effect the adjustment of said regulator with relation to said throat, a money-carrier rotatable within said regulator and coöperative therewith, a fixed scale supported independently of the said regulator and having suitably-spaced graduations, and a pointer or finger coöperative with said scale.

7. In a prepayment attachment for meters, a valve-stem having a cam, a spirally-grooved shaft, means to slide said shaft, a finger mounted on said shaft loosely and coöperating with the cam of the valve-stem, means to adjust said finger on said shaft, and guiding means for said finger as it is moved with said sliding shaft, substantially as described.

8. In a prepayment attachment for meters, a delivery-indicator scaled to indicate different prices at which gas is to be sold; a cylindrical delivery-regulator having a money-discharging throat; a stop at one side of said throat; a support in which said delivery-regulator may be turned to bring its money-discharging throat in any desired position with relation to a particular scale-mark of the price-indicator according to the price of gas; means to retain said delivery-regulator in adjusted position; a money-carrier adapted to receive money at a given starting-point and to carry said money a greater or less distance according to the position of said discharging-throat and moving the shaft with the carrier until the money is discharged; means for causing the carrier to traverse a complete circle during each operation thereof, and a cutting device controlled in part by the coin-carrier.

9. In a prepayment attachment for meters, a recording mechanism actuated by the meter mechanism while gas is being delivered; a valve; a spirally-grooved valve-controlling shaft; means loosely connected with and adjustable on said shaft to actuate said valve; a money-carrier; means intermediate it and said shaft and adapted to be coupled with said money-carrier to actuate said shaft for a greater or less distance to effect the opening of said valve; an adjustable cylindrical delivery-regulator having a money-discharging throat, said money-carrier being free to be turned in said delivery-regulator toward said money-discharging throat; combined with a price-indicator having scale-marks to indicate different prices for gas, said scale-marks indicating the point at which the money-discharging throat of the delivery-regulator is to be set in order that the money-carrier may have imparted to it a greater or less extent of stroke as required for the discharge of money the distance through which the money is carried by the money-carrier increasing as the price of gas is reduced, substantially as described.

10. In a prepayment attachment for meters, a price-indicator scaled or figured to indicate prices of gas at different values; a case having a money-receiving throat; a delivery-regulator within said case and presenting below said throat a guide, and a stop and a money-delivering throat which may be adjusted and kept at a greater or less distance from the receiving-throat of the said case and to coöperate with one or the other of the scales or figures of the price-indicator to thereby insure in the operation of the meter the delivery to the consumer of a quantity of gas at the price indicated on the indicator opposite said throat, equivalent to the value of the coin put into the meter, substantially as described.

11. In a prepayment attachment for meters, a case having a throat to receive money, a cylindrical delivery-regulator provided with a stop and having a circumferential slot and a money-discharging throat, one part of said circumferential slot being of a width in excess of the diameter of the coin to be fed into the meter that said coin may pass through said regulator and into the slot of the money-carrier, the other part of said slot being of a width less than the diameter of said coin to thereby support one edge of the coin extended from the slot of the money-carrier until said coin is brought by the circular movement of the money-carrier into position opposite said money-discharging throat, means to turn and thereby adjust said regulator in said case to adapt the attachment to the price of gas, and a money-carrier arranged to turn within said regulator, said money-carrier receiving the money from the throat of the case through the slot of said regulator and discharging said money through the money-discharging throat of the regulator, substantially as described.

12. In a prepayment attachment for meters, a case having a throat to receive money, a circular delivery-regulator provided with a stop and having a circumferential slot and a money-discharging throat, one part of said circumferential slot being of a width in excess of the diameter of the coin to be fed into the meter that said coin may pass through said regulator and into the slot of the money-carrier, the other part of said slot being of a width less than the diameter of said coin to thereby support one edge of the coin extended from the slot of the money-carrier until said coin is brought by the circular movement of the money-carrier into position opposite said money-discharging throat, means to turn and thereby adjust said regulator in said case to adapt the attachment to the price of gas, and a money-carrier arranged to turn within said regulator, said money-carrier receiving the money from the throat of the case through the slot of said regulator and discharging said money through the money-discharging throat, and a price-indicator to indicate the price of gas to thereby enable said regulator to be put into any desired definite position according to variations in price of gas, substantially as described.

13. In a prepayment attachment for meters, a money-carrier having a slot to receive money, a cylindrical delivery-regulator, having a circumferential slot and a money-discharging throat, one part of said slot being of a width in excess of the diameter of the coin to be fed into the meter that said coin may pass through said regulator and into the slot of the money-carrier, the other part of said slot being of a width less than the diameter of the said coin to thereby support one edge of the coin extended from the slot of the money-carrier until said coin is brought by the circular movement of the money-carrier into position opposite said money-discharging throat, substantially as described.

14. In a prepayment attachment for meters, a money-carrier having a slot to receive money, a cylindrical delivery-regulator having a circumferential slot and a money-discharging throat, one part of said slot being of a width in excess of the diameter of the coin to be fed into the meter that said coin may pass through said regulator and into the slot of the money-carrier, the other part of said slot being of a width less than the diameter of the said coin to thereby support one edge of the coin extended from the slot of the money-carrier until said coin is brought by the circular movement of the money-carrier into the position opposite said money-discharging throat, and means carried by said money-carrier to eject the money therefrom through said money-discharging throat, substantially as described.

15. In a prepayment attachment for meters, a case having a throat to receive money, a delivery-regulator provided with a stop and having a circumferential slot and a money-discharging throat, one part of said circumferential slot being of a width in excess of the diameter of the coin to be fed into the meter that said coin may pass through said regulator and into the slot of the money-carrier, the other part of said slot being of a width less than the diameter of said coin to thereby support one edge of the coin extended from the slot of the money-carrier until said coin is brought by the circular movement of the money-carrier into position opposite said money-discharging throat, a money-carrier located inside said regulator to receive and carry a coin and put it against said stop, said money-carrier being shaped substantially as described to thereafter pass said stop, means to rotate said money-carrier in one direction only that it may after the discharge from it of the coin therein pass the stop of said regulator, and means to prevent any backward rotation of said coin-carrier, substantially as described.

16. In a prepayment attachment for meters, a case having a throat to receive money, a delivery-regulator provided with a stop, and having a circumferential slot and a money-discharging throat, one part of said circumferential slot being of a width in excess of the diameter of the coin to be fed into the meter that said coin may pass through said regulator and into the slot of the money-carrier, the other part of said slot being of a width less than the diameter of the said coin to thereby support one edge of the coin extended from the slot of the money-carrier until said coin is brought by the circular movement of the money-carrier into position opposite said money-discharging throat, means to turn and thereby adjust said regulator in said case to adapt the attachment to the price of gas, and a money-carrier arranged to turn within said regulator, said money-carrier receiving the money from the throat of the case through the slot of the said regulator and discharging said money through the money-discharging throat of the regulator, a spirally-grooved and longitudinally-splined shaft, a spline or projection entering said spiral groove, a finger carried by said shaft, a valve-stem slotted to coöperate with said finger to open said valve, a toothed wheel connected with said shaft by a spline in the longitudinal groove thereof, and an actuating device carried by said money-carrier and actuated by a coin therein, to cause said device to engage the teeth of said toothed wheel and rotate said shaft, it, during its rotation, being slid longitudinally due to the thread fitting said spiral groove loosely, substantially as described.

17. In a prepayment attachment for meters, a delivery-regulator having a discharging-throat for the discharge of the money put into the meter to prepay gas, and a stop having a projecting shear portion or ear; combined with a money-carrier having a slot to receive a coin and carrying a coöperating shear portion, said money-carrier being capable of passing the stop and projection of the said regulator after the discharge of the coin from the money-carrier, and means to rotate said money-carrier in but one direction, substantially as described.

18. In a prepayment attachment for meters, a delivery-regulator having a discharging-throat for the discharge of the money put in the meter to prepay gas, and a stop having a projecting shear portion or ear; combined with a money-carrier having a slot to receive a coin and carrying a coöperating shear portion, said money-carrier being capable of passing the stop and projection of the said regulator after the discharge of the coin from the money-carrier, means to rotate said money-carrier in but one direction, and means to prevent any backward rotation of said money-carrier, substantially as described.

19. In a prepayment attachment for meters, a case having a money-receiving throat, a delivery-regulator arranged within said case and provided respectively with a stop and with a pointer, and having a circumferential slot and a money-discharging throat, one part of said slot being of a width in excess of the diameter of the coin to be fed into the meter that said coin may pass through said regulator and into the slot of the money-carrier, and the other part of said slot being of a width less than the diameter of the said coin to thereby support one edge of the coin extended from the slot of the money-carrier until said coin is brought by the circular movement of the money-carrier into position opposite said money-discharging throat; mechanically-concealed means to adjust said regulator in said case; a price-indicator with which said pointer coöperates, said indicator indicating the price of gas; a money-carrier arranged within said regulator and adapted to take money from said receiving-throat and deliver it through the money-discharging throat in any of its adjusted positions.

20. An adjustable delivery-regulator having a money-discharging throat, and having a circumferential slot, one part of said slot being of a width in excess of the diameter of the coin to be fed into the meter that said coin may pass through said regulator and into the slot of the money-carrier, the other part of said slot being of a width less than the diameter of the said coin to thereby support one edge of the coin extended from the slot of the money-carrier until said coin is brought by the circular movement of the money-carrier into position opposite said money-discharging throat, a money-carrier arranged within said regulator and having a spring, and a slide to act against the money as it is being put through the slot of the said regulator into the money-carrier, said money entering said money-carrier acting to compress said spring, whereby said spring on the arrival of the money opposite the money-discharging throat of said regulator will eject the money from said money-carrier, substantially as described.

21. A delivery-regulator having a stop provided with a shear-like projection and a money-discharging throat in line with one edge of said stop; combined with a rotatable money-carrier having an attached actuating device or pawl and a shear-like projection, said money-carrier being shaped to embrace and travel over and past the stop of the said regulator, whereby a wire or other thing inserted in the slot of the money-carrier on its arrival at the stop of said regulator will be severed by the contact against it of the shear projection of the stop and of the money-carrier, and means to prevent the rotation of said money-carrier except in one direction, substantially as described.

22. In a prepayment attachment for meters, a gas-valve having a stem; a spirally-grooved shaft having a finger mounted thereon loosely and coöperating with the valve-stem; means to slide said shaft in a direction to cause said finger to open said valve; means to adjust said finger on said shaft, and guiding means for said finger as it is moved with said shaft.

23. In a prepayment attachment for meters, a money-carrier having a spring; a delivery-regulator presenting inclines, a stop and a money-discharging throat; means to rotate said money-carrier and cause the money extending therefrom to meet said inclines and be thereby forced farther into said money-carrier to compress said spring in order that it may effect the discharge of money from said carrier when in the movement of the carrier the money arrives opposite the money-discharging throat.

24. In a prepayment attachment for meters, a delivery-regulator having a money-discharging throat and a stop, and a connected clamping device including a screw inserted in said stop and carrying a clamp, a circular case or support to receive said delivery-regulator and slotted to receive said screw that the latter may move in said slot to effect the adjustment of said regulator from one to its other position, and a price-indicator; combined with a money-receiving box concealing said price-indicator and said clamp and screw from access by the consumer, substantially as described.

25. In a prepayment attachment for meters, a slotted valve-stem having ears, means to guide said ears, a sliding and rotating shaft having a finger or projection entering the slot of said valve-stem to operate it, substantially as described.

26. In a prepayment attachment for meters a delivery-regulator made as a ring having slots $h$ and $h'$ varying in width, the slot $h'$ being terminated by a discharging-slot, substantially as described.

27. In a prepayment attachment for meters, a delivery-regulator made as a ring having slots $h$ and $h'$ varying in width, the slot $h'$ being terminated by a discharging-slot, said regulator having applied to it near its discharging-slot a stop, substantially as described.

28. In a prepayment attachment for meters, a valve-stem having a cam, a spirally-grooved shaft, means to slide said shaft, a finger mounted on said shaft loosely and coöperating with the cam of the valve-stem, means to adjust said finger on the shaft, guiding means for said finger as it is moved with said sliding shaft, a money-delivery regulator, a money-carrier rotatable within said regulator, a support for said regulator having a money-receiving throat, means to effect the adjustment of said regulator with relation to said throat, means carried by the money-carrier and operable by a coin for coupling the latter to said shaft, and a price-indicator coöperative with said delivery-regulator.

29. In a prepayment attachment for meters, a money-carrier consisting of a hub having extended from it at one side only in the same direction two arms, each arm being grooved at its inner side to constitute registering slots for the reception of money, one of said arms having a projection to act as one member of the shear; combined with a stop changeable in its position to designate the point at which money is to be discharged from said money-carrier, said stop having a coöperative shear member whereby in the movement of said carrier past said stop a wire or other thing in the carrier will be cut.

30. In a prepayment attachment for meters, a case having a money-receiving throat, a price-indicator having suitable scale-marks to indicate prices of gas, a delivery-regulator fitting said case and having a stop provided with a screw extended outwardly through a slot in said case and a clamp applied to said screw, the loosening of said screw permitting the regulator, screw and clamp to be moved in unison in the said slot into any position in which it is desired to put and clamp said regulator with relation to the receiving-opening of said case, and the scale-marks of said price-indicator, and a money-carrier to take money from said money-receiving throat and deliver it at said money-discharging throat.

31. In a prepayment attachment for meters, a case or support; a longitudinally-movable valve-controlling shaft; a moving carrier mounted loosely thereon and having at one end an extended hub; a hollow hand-operated sleeve embracing the outer end of said shaft, the inner end of said sleeve being detachably connected with the hub of said money-carrier and taking bearing in said face or support, said sleeve having a groove and an annular cam; combined with a cover for the money-receiving throat of said case; and a pin coöperating with said sleeve, the latter in one position permitting the said cover to be opened, and at another position holding said cover locked.

32. In a prepayment attachment for meters, a gas-controlling valve; a spirally-grooved valve-operating shaft; means to rotate and slide said shaft to open said valve; a nut surrounding said shaft and having a projection entering the spiral groove therein, said nut having worm-teeth, the hub of said nut entering a bearing, leaving the end of said nut without support; means to stop said shaft in its extreme position after fully opening said valve, a shaft actuated by the meter mechanism and having a spiral worm engaging the worm-teeth of said nut, the supporting end of said hub preventing the exertion of any holding friction on the end of said hub due to operating the controlling-shaft in opening the valve, whereby the worm of the meter-actuated shaft may always act under uniform tension and enable said nut to be rotated with the same exertion of power in all conditions of the meter, substantially as described.

In testimony whereof I have signed my name to this specification in the presence of two subscribing witnesses.

CHARLES LUKE.

Witnesses:
HENRY G. THOMPSON,
GEORGE E. HAIGHT.